UNITED STATES PATENT OFFICE.

WILLIAM E. TAYLOR, OF EAST ORANGE, NEW JERSEY, ASSIGNOR TO AMERICAN CAN COMPANY, OF NEW YORK, N. Y., A CORPORATION OF NEW JERSEY.

PROCESS OF PRESERVING FISH.

1,250,384.  Specification of Letters Patent.  Patented Dec. 18, 1917.

No Drawing.   Application filed March 16, 1916.   Serial No. 84,611.

*To all whom it may concern:*

Be it known that I, WILLIAM E. TAYLOR, a citizen of the United States, residing at East Orange, in the county of Essex and State of New Jersey, have invented certain new and useful Improvements in Processes of Preserving Fish, of which the following is a specification.

This invention relates to an improvement in the art of preserving sardines or other fish suitable to be treated, having for its principal objects to prepare the fish properly cooked and ready for sealing in the cans, with a saving in labor and expense and without breaking or injuring the fish, and in such manner that no water, or not enough moisture to be injurious, is allowed to be sealed up with the fish; this invention being an improvement on that described in my Patent No. 1,016,046, dated Jan. 30, 1912.

With such objects in view, as well as other advantages which may be incident to the use of the improvement, the invention consists in the procedure and in the use of the parts and combinations thereof hereinafter set forth and claimed, with the understanding that the several necessary elements or steps constituting the same may be varied without departing from the nature and scope of the invention.

The fresh fish having been pickled in salt brine and dried in any suitable manner, which is a common procedure which may be followed, are or may be packed dry in open cans in which they are to be sealed and preserved. The fish so packed are then brought in contact with heated oil in such manner that the fish are properly fried and cooked, for which purpose said oil is or may be at the boiling point. This cooking causes a certain amount of water or fluid to pass by osmosis out of the fish and collect in the bottoms of the cans beneath the oil, and this water I remove in any suitable manner before sealing the cans, as it might otherwise cause the spoiling or deterioration of the fish or their flavor. The steps of packing and cooking in oil in the preserving cans may be carried out as described in my patent. Preferably the cans, filled with fish and oil, are held in or passed through a body of boiling oil so as to be immersed for a suitable length of time for the frying and cooking of the fish, which time may depend upon the size of the fish and temperature of the cooking oil, about four minutes being ordinarily sufficient. Before the cans are removed from the heated oil they are tilted sufficiently to pour out the collected water, which will sink to the bottom of the body of oil, and is replaced by oil from said body which enters the cans. The cans are then reverted and are removed from the said body of oil, each can remaining filled, or substantially filled, with the heated oil. The cans are then hermetically closed and sealed.

The removing of the water should take place at or about the end of the cooking process, or at any time when no more water will pass out from the fish.

In practising the process according to said preferred manner the packed cans may be handled by a conveyer passing continuously through a vat of heated oil, with provision of suitable means for tilting the cans and for retaining the fish within the cans.

Results of this process are that the fish are well cooked, have a fine flavor, are not broken up or injured, all germs are destroyed and the fish will not spoil or deteriorate; and the process is simple, inexpensive and rapid, no processing being required after the sealing of the cans, othen than such sterilization as may be necessary to destroy germs or bacteria which might get into the tops of the cans in the interval between the passing of the cans from the oil and the sealing of the covers. But the invention does not exclude such processing if it be desired to perform it. And a preliminary drying of the fish is not necessary to the process herein claimed.

What is claimed is:

1. The process of preserving fish, consisting in placing the fish together with oil in open cans and subjecting them to a cooking heat, and after the removal, from beneath the oil in the cans, of water or fluid collected from the fish, sealing the cans while hot.

2. In a process for the preservation of fish, the bringing of the fish while packed in open cans and leaving the cans properly charged with oil, into contact with heated oil in such manner that the fish are properly fried and cooked, then removing any collected water or fluid from within the cans, and then sealing the cans.

3. In a process for the preservation of fish, packing the fish in open cans, passing said fish and cans through heated oil, pouring out from the cans the oil and any water or fluid collected from the fish and replacing the same with heated oil, and then sealing the cans.

4. In a process for the preservation of fish, passing the fish in open cans through a body of heated oil to fry and cook the fish, tilting the cans while immersed in said oil to pour out any water or fluid, and reverting the cans in said oil to refill them with the necessary amount of said oil.

5. In a process for the preservation of fish, cooking fish in oil and in the can in which they are to be packed, thereby causing water and liquid to exude from the fish, then removing such water and liquid from the can and leaving the can properly charged with oil and then sealing the can.

6. The method for the preservation of fish, which consists in passing an open filled container, in which the fish are packed, through a bath of heated oil and during the passage therethrough of said container, wholly or partially inverting the container to permit the liquid contents to flow from within the container and then restoring the said container to approximately its normal condition for resubmergence within the oil for filling or partial filling of the said container.

In testimony whereof I affix my signature.

WILLIAM E. TAYLOR.